July 4, 1939.　　　A. J. BERG ET AL　　　2,164,303
TOOL FOR CUTTING OR TURNING
Filed Dec. 8, 1937　　　2 Sheets-Sheet 1

INVENTORS
ALFRED J. BERG
JOHN O. HUSE
BY Robert A. Lavender
ATTORNEY

July 4, 1939. A. J. BERG ET AL 2,164,303
TOOL FOR CUTTING OR TURNING
Filed Dec. 8, 1937 2 Sheets-Sheet 2

INVENTORS
ALFRED J. BERG
JOHN O. HUSE
BY
ATTORNEY

Patented July 4, 1939

2,164,303

UNITED STATES PATENT OFFICE 2,164,303

TOOL FOR CUTTING OR TURNING

Alfred J. Berg, Portsmouth, N. H., and John O. Huse, United States Navy

Application December 8, 1937, Serial No. 178,700

5 Claims. (Cl. 29—95)

(Granted under the act of March 3, 1883, as amended April 30, 1928; 370 O. G. 757)

In the prior art, metal has been turned by a lathe, a screw machine or other turning or cutting tool merely to transform the metal into useful articles of the desired shape and dimensions, and the treatment of the cut or turned metal articles to increase their strength or toughness has been accomplished only as a separate operation by a wholly different class of equipment and skilled workmen. Our present invention accomplishes these two independent practices by different facilities and operatives by and simultaneously with the cutting or turning of the metal to the desired dimension which we have found rapidly, efficiently, and without other handling or processing to increase the strength, toughness and surface density of the cut or turned metal articles to different degrees which we have found very satisfactory and advantageous in many different uses and classes of service of such articles.

In the prior practice the cutting or turning problem has heretofore been approached and solved solely from the aspect of most readily and economically reducing the metal to the dimensions required to make a useful article, and it has been regarded as impractical or impossible to simultaneously therewith, much less thereby, increase the strength, toughness and surface density of the turned or otherwise cut metal. One of the main factors which have lead the prior art away from our solution of the problem represented by the present invention is that the prior practice has been to cut or turn off the required metal with the least expense of time and power and the least duty and wear upon the cutting or turning tool.

In the practice of our method we increase the cutting stress upon the surface of the metal being cut or turned and thereby transform the characteristics of the metal at and adjacent the surface being cut or turned to afford the requisite strength, toughness and surface density which will afford satisfaction in the use and class of service which may be required of the part or parts thus cut or turned. This increased strength, toughness and surface density of the cut or turned metal may be accomplished uniformly throughout the whole, or localized in portions, of the metal required to be cut or turned in accordance with our invention. Such cutting or turning may, according to our invention, be of uniform, different or varying diameters as well as end cuts, turnings or other cutting; and substantial lengths of radial as well as longitudinal turning or other cuts may be simultaneously made, according to our invention, thereby transforming the characteristics of the cut metal.

More specifically, our invention attains the stated transformations of the characteristics of the cut or turned metal by the cutting or turning tool being designed and adapted to cold work the metal being cut as well as the metal being removed by the cutting operation in accordance with our method. Such cold working may differ in kind and degree in different portions of the article or differently in the extent of the cut, turned or otherwise machined surface of the article, as may be desired, according to the design of the cutter or our method of using the same, or both.

Much research has been given in the past to cutting tools of different kinds as to the different angles formed by the faces of the cutting tool itself, such angles being known as cutting, clearance, top rake, and side rake. Such investigation has resulted in the development, utilized for many years, of such angles as will cut different kinds of metal with the least power and wear upon the tool. Such power and wear means less thrust of the cutter upon the material being cut, as well as less liability of affecting the characteristics of the material being cut.

In the attainment and practice of our invention little change need be made in the cutting tool heretofore found most efficient for the cutting of each different character of metal, except in respects opposite to or not in accord with prior teachings in the art. These changes are in the top rake and the side rake of the cutting portion of the tool and function to cold work the metal as the same is cut to the desired size and shape and by the tool which performs such cutting. This cold working transforms the metal forming the surface of the cut article and increases the strength, toughness and surface density of such metal very expeditiously and inexpensively while the same is at atmospheric temperature except for such heat as may be generated for such cutting. This transformation, occurring simultaneously with and occasioned by such cutting, we have found very satisfactory and advantageous in many different uses and classes of service of articles formed by such cutting.

Other objects, advantages and accomplishments of our invention will be rendered apparent, in the course of this specification, to those skilled in this art.

In the drawings, Figure 1 is an enlarged diagrammatic view illustrative of our invention, in which the parts are shown in cross-section with irrelevant portions thereof broken away;

The article 10 represents any article having surfaces, any or all of which may be cut or turned in accordance with our invention.

Figure 1:
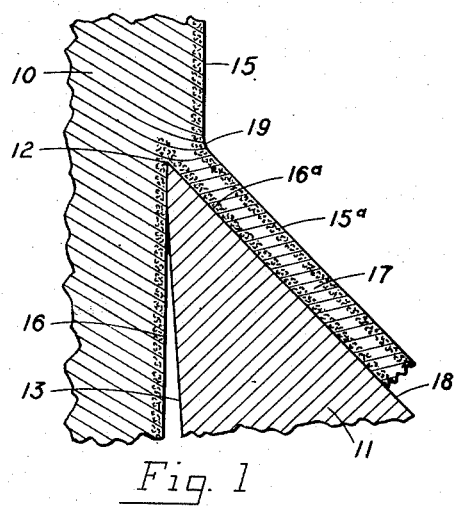
Figure 4:
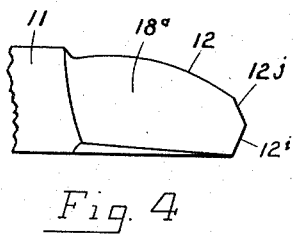
Fig. 4 is a side elevation view of the cutting portion of the tool indicated in Fig. 1, in which the side rake surface is arched longitudinally and transversely and the cutting edge is curved or arched.
Figure 5:
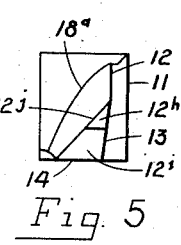
Fig. 5 is an end view of the cutter shown in Fig. 4.
Figure 8:
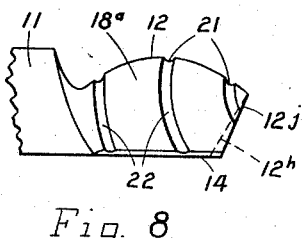
Fig. 8 is a side elevation view similar to Fig. 4, but showing a different curvature for the cutting edge.
Figure 15:
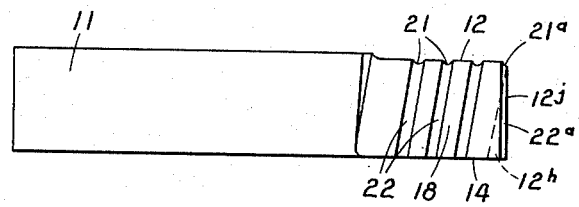

Our invention may be most readily and broadly understood by initial reference to Fig. 1, in which the parts are shown enlarged. 10 represents a portion of the article being cut to its desired dimensions by a cutter 11 having a cutting edge 12 having clearance surface 13, side rake surface 18 and bottom surface 14, shown typically in Figs. 4, 8 and 15. The surface 15 of article 10 has, in the instance shown, been previously cut by cutter 11, and surface 16 of article 10 is shown partially cut by the succeeding action of cutter 11. The top and side rakes of cutter 11, represented by its edge 12 and surface 18, so act upon the metal of article 10 being cut by cutter 11 as to exert pressure upon such metal beyond its elastic limit. Such pressure transforms the metal on opposite sides and somewhat in advance of the line of cleavage, represented by the successive surfaces 15, 16, as to increase the density of such metal, which may be indicated by the stippling adjacent surfaces 15, 16, and on the shaving 17 being cut from article 10. When the article 10 is of copper, for instance, the surfaces 15, 16 are bright, as is the surface 16a of shaving 17, while at and below the point 19 the metal comprising surface 15a of shaving 17 is further transformed from a bright to a dull or frosted surface appearance which continues throughout the extent of surface 15a of shaving 17. Such transformation takes place as the metal of article 10, comprising shaving or chip 17, is deflected at a wide angle from surface 15 laterally downward with its surface 15a in firm frictional contact with the side rake surface 18 of tool 11. Such deflection further subjects metal of surface 15a, and of surface 15 adjacent point 19, to compression stress which results in a permanent increased density of such metal, whose density had been increased beyond that normal for the metal of article 10 by the preceding cut which resulted in surface 15. This transformation of the characteristics of the metal of shaving 17 tends to increase the magnitude of the cleavage thrust of cutter 11 upon the metal of article 10 by toughening the metal of shaving 17, and thus increasing its reluctance to deflection over the side rake surface 18 of tool 11.

When surface 15 of article 10 has been uncut by cutter 11 the metal of such surface, as well as of the outer surface of chip or shaving 17 initially cut therefrom, is of the untransformed characteristics of the virgin metal of article 10, except the heretofore described transformation occurring at point 19.

Figure 2:
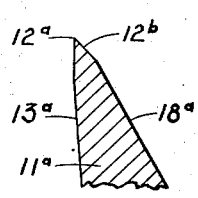
Figs. 2 and 3 are cross-sectional views of modifications of the tool shown in Fig. 1.
Figure 3:
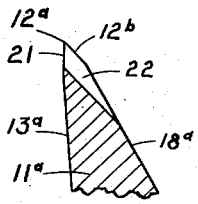

The top and side rakes of cutter 11 may be normal for the kind of metal or alloy to be cut with such cutter, in which case one or both of such rakes are provided with means which cold works the metal to substantially the above stated characteristics as the same is being cut. One form of such means is disclosed in Fig. 2 in which the clearance surface 13a and the side rake surface 18a of tool 11a, having cutting edge 12a, are to be understood as normal for the kind of metal or alloy to be cut or turned by such tool. However, the top rake of this tool is increased to afford the required magnitude of its thrust upon the metal of article 10 to be cut or turned by tool 11a to afford the desired increased density of the metal. This top rake is so increased, in this instance, by the beveled surface 12b extending from cutting edge 12a to merge with, and at a more abrupt angle than, the side rake surface 18a. An additional form of such means may be provided on the tool 11b of Fig. 3, which is the same as tool 11a of Fig. 2 with the addition of one or more narrow and shallow nicks 21 in cutting edge 12a. A groove 22, corresponding and registering with each nick 21, extends downwardly from each nick 21 across at least a portion of side rake surface 18a, preferably at a less abrupt angle than said surface 18a and at an angle which may be more abrupt than or equal to that of said surface 18a accordingly as said groove 22 extends partially or wholly across said surface 18a. The tool of Fig. 3 will cold work the surface metal of article 10, cut or turned thereby, to an extent, substantially in excess of that possible with the tool of either Fig. 1 or 2, dependent upon the number of nicks 21 and grooves 22 therein. The nicks 21 and grooves 22, or other such means, may be arranged in number and at places in the length of the cutting edge 12a where the metal of the surface of article 10 is subjected to greater wear or is for other reasons required to be stronger or less ductile.

The cutting tool shown in Figs. 10 to 15 inclusive, discloses substantially the same tool indicated in Fig. 1 having the wide angled side rake surface 18, but provided with a different number of nicks 21 and grooves 22. The cutter or turning tool disclosed in Figs. 4 to 9 inclusive, has its cutting edge 12 arched and its side rake surface 18 arched longitudinally and transversely. The function of the straight cutting edge 12, Figs. 10 through 15, having one or more nicks therein and of the arched cutting edge 12 of Figs. 4 through 9, is to increase the length of the cutting edge. This increased length within a given space increases its cutting thrust upon the metal being cut or turned thereby, which correspondingly increases the cold working effect upon the surface of article 10 being cut or turned. The angle of the side rake surface 18 of the cutter 11 and the grooves 22 therein associated with the nick or nicks 21, in cutting edge 12 also increases the cold working effect upon the surface of article 10 being cut or turned thereby. Each of the nicks 21 in cutting edge 12 further cold work the metal of the surface of article 10 being cut or turned thereby, in that there is a flowage of metal along the sides of each nick 21 toward the low point thereof while the cutting edge 12 is engaged in such cutting or turning. The arched cutting edge 12 of Figs. 4 through 9, also further cold works the metal of the surface of article 10 being cut or turned thereby, due to the same causing some flowage from the high toward the low point or points in such arched edge while the same is performing its cutting function. Such arched edge 12 further cold works the metal of the surface of article 10 being cut or turned thereby. Such additional cold working is due to the fact that between the points represented by the inner and outer edges of the extent of the cut made by such arched cutting edge 12 the arch of such edge extends to different depths within the metal being cut thereby. This increases the reluctance to the passage of the severed metal over at least that portion of the side rake surface 18 of the tool 11 which is within the pocket area bounded on one side by the arched edge 12, and on the other side by a line passed between the separated points upon said arched edge 12 representing the width of the cut of metal being made by said arched edge 12.

Figure 9:
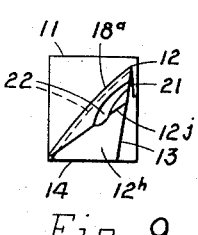
Fig. 9 is a front elevation view of the cutter shown in Fig. 8.

The provision of nicks 21 in the arched cutting edge 12 of Figs. 8 and 9 increases the cold working effect of such cutting edge, while the provision of the grooves 22 upon the beveled and arched side rake surface 18 of the cutter or turning tool 11 of Figs. 8 and 9, also increases the cold working effect of the arched and beveled side rake surface 18 of the cutter or turning tool shown in Figs. 4 through 7.

Figure 13:
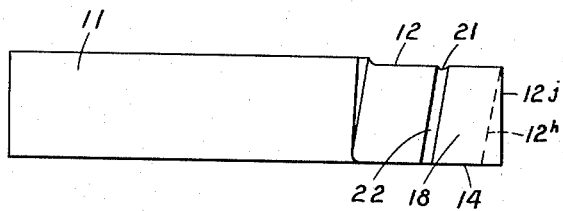
Figs. 13 and 15 are side elevation views of the cutter of Fig. 1 having different numbers of nicks and grooves therein.
Figure 14:
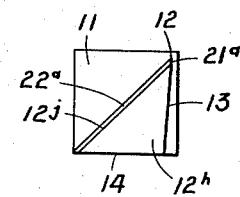

The grooves 22 shown in Figs. 8 through 11 are curved, while those shown in Figs. 13 through 15 are straight and at a slight angle. These vary the reluctance of passage of the surplus severed metal over the side rake surface 18 of the tool 11, according to whether such cutter or turning tool is cutting in a straight line or in the arc of a circle.

In the development of our invention we have developed a method, and provided means for its economical and efficient practice, of simultaneously making two cuts at substantial angles to each other in such a manner as also to thereby cold work advantageously the metal of both of these surfaces of article 10 being formed thereby. One of these cuts has heretofore been explained.

The method of making and the means for practising the second cut at a substantially different angle simultaneously with the making of the first stated cut, will now be explained.

When making only the first cut the characteristics of the tip or outer end of the cutter or turning tool 11 are inconsequential; but when the same cutter or tool 11 is equipped to simultaneously make both of the cuts while cold working the metal of the surface of article 10 being formed thereby, the characteristics of the cutter or tool 11 are consequential.

In the instance shown in Figs. 4, 5, 8 and 9, the tip or outer end of the cutter or tool 11 is provided with a cutting edge 12j joining with and extending laterally downward from the outer end of the cutting edge 12. The angular length of the cutting edge 12j exceeds the thickness of the surplus metal of article 10 desired to be removed at a single cut. While the cutting edge 12 is functioning to cut the metal at one angle, the edge 12j simultaneously functions to cut the metal at a substantially different angle that may be desired. The cutter of Figs. 4, 5, 8 and 9, as well as the cutter of Fig. 11 to be hereinafter explained, produces an angle at the juncture of the cutting edges 12 and 12j. When a curve is desired to join the two simultaneously cut surfaces of article 10 at different angles, a similarly curved cutting edge 12n joins the tip or outer end of the cutting edge 12, said curved edge 12n extending laterally downward from the outer end of the cutting edge 12. At the juncture of the edges 12 and 12n the adjacent surfaces of the cutter 11 is provided with a nick 12m, Figs. 6, 7 and 10, whose wall adjacent said edges 12 and 12n extends downward more bluntly than the angle at which the side rake surface 18 extends from said edges. In addition to making said curved juncture between the differently angled surfaces of article 10, said nick 12m further cold works the metal of article 10 at said juncture by increasing the length of the line of cleavage normally afforded by the nick as well as by the increase, within the area of said nick 12m, of the top rake of the tool of Figs. 6, 7 and 10, which more extensively cold works the metal of article 10 being cut by the cutting edges 12, 12m, at the margin of nick 12m.

Figure 11:
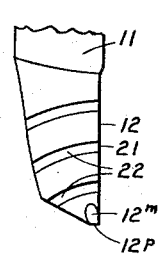
Fig. 11 is a top plan view similar to Fig. 10, but disclosing a slightly modified outer end of the cutter.

The cutter or tool of Fig. 11 is provided at its tip or outer end with a cutting edge 12p which is, in the instance shown, at right angles to the cutting edge 12, said edges being joined by corresponding angles. The length of cutting edge 12p is adapted to exceed the thickness of the surplus metal to be cut or turned from article 10 at any one time. The nick 12m is formed at and adjacent the intersection of said edges 12 and 12p.

Figure 12:
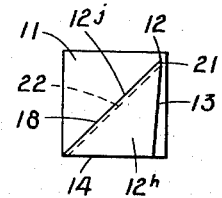
Figs. 12 and 14 are end elevation views respectively of the cutters shown in Figs. 13 and 15.

The cutter of Figs. 12 and 13 is provided with the cutting edge 12j as heretofore explained in connection with Figs. 4, 5, 8 and 9.

The cutter of Figs. 14 and 15 is provided, in the instance shown, with a half portion of a nick 21a in the tip end of the cutting edge 12, from the bottom of which nick 21a extends laterally downward from the edge 12 a cutting edge 12j. This cutting edge 12c may extend at the same angle at which the side rake surface 18 of the tool 11 extends. In such side rake surface 18 adjacent the cutting edge 12c is formed half of a groove 22a. The metal cut by the half nick 21a is further cut by the cutting edge 12c which extends at a substantial angle to the cutting edge 12 and which cutting edges 12 and 12c join at the bottom of the half nick 21a. The half nick 21a, its half groove 22a, and the cutting edges 12 and 12c associated therewith, further cold work the metal being cut at the outer end of the tool 11. The arch of the cutting edge 12 of tool 11 of Fig. 4, inclining more toward the outer end of tool 11, causes the flow of metal along such edge while cutting, and hence produces a greater amount of cold working of the metal of the surface of article 10, being cut or turned thereby, in the area of the outer end of tool 11. The arch of the cutting edge of tool 11 of Fig. 8, being inclined equally in opposite directions from the center of the length of such edge, occasions, while the same is cutting, a flowage of metal in opposite directions along such edge, and produces a more uniform cold working of the metal of the surface of article 10 being cut thereby.

The article 10 may be of any kind of metal of any desired shape, a part or all of whose surfaces may be cut or turned to the desired size.

Figure 16:
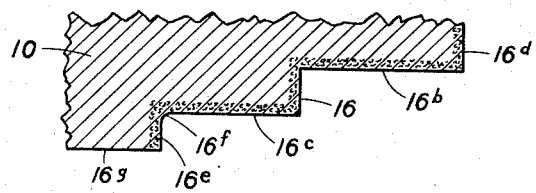
Fig. 16 is a cross-sectional view typically of a portion of any article any of the surfaces of which may be cut or turned by a cutting or turning tool.

In Fig. 16 a fragmentary portion of article 10 is shown having typical surfaces 16 and 16d at opposite ends of and at right angles to an intervening surface 16b, and surface 16c and 16e at right angles to each other with a curve or fillet 16f comprising their junction point. The surfaces 16, 16b, 16c, 16d and 16e are cut or turned surfaces, the metal cut or turned therefrom being typically shown in dotted lines, while surface 16g is the virgin metal of article 10. The surfaces 16d, 16 and 16e are adapted to be cut or turned by the cutting edge 12. In cutting or turning to dimension the surfaces 16, 16b the tool 11 shown in Figs. 4, 5, 8, 9, 12 through 15, or that of Fig. 11, may be employed. Its outer or tip end cutting edge 12j, 12c or 12p may be set to the plane of surface 16b and successive cuts made with the right angled cutting edges of either of such cutters or turning tools 11, until the surfaces 16, 16b are finished. In cutting or turning to dimension the surfaces 16c, 16e and 16f the tool 11 of Figs. 6, 7, or 10 may be employed in like manner as next before stated in which its cutting edge 12n cuts or turns the surface 16c, as well as at its last cut leaves the curve or fillet 16f while the cutting edge 12 at its last cut leaves the surface 16e. In cutting or turning the surface 16b, the cutting edge 12j of Figs. 4, 5, cold works the metal as it progressively cuts or turns the same to the desired dimension. In such cutting and cold working the flowage of metal along cutting edge 12 toward the outer or tip end of cutter or turning tool 11, continues onto and along, as well as over, the angular cutting edge 12j. While such flowage may not be the sole cause of such cold working, we have found that the metal of the surface of articles 10 cut by said cutting edge 12j is superior in many desirable respects to that resulting from cutting or turning in accordance with prior practice.

In the cutting of surfaces 16 and 16b with the tool of Fig. 11, the notch 12m initially increases the top rake of the cutting edges 12, 12p within the area of such notch by in said area increasing the angle of the side rake surface of tool 11, which, with the metal severed by cutting edges 12 and 12p simultaneously flowing at right angles to each other into notch 12m, each increases the reluctance to flowage of the severed metal from notch 12m and over the beveled side rake surface 18 below notch or nick 12m, and adds substantially to the cold working effect upon the surface 16b, throughout its extent, and of surface 16 in the region of surface 16b of the metal of article 10 cut or turned by tool 11.

Figure 6:
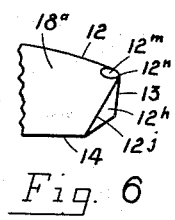
Fig. 6 is a perspective view of a modified outer end of the cutter shown in Figs. 4 and 5.
Figure 7:
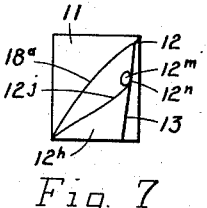
Fig. 7 is an outer end view of the cutter shown in view 6.
Figure 10:
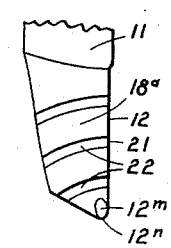
Fig. 10 is a top plan view of the cutter shown in Fig. 1 provided with nicks in its cutting edges.

The action of notch or nick 12m of Figs. 6, 7 and 10 is similar to that just described.

When the tool 11 is employed for turning metal the relation of its cutting edges, nicks and grooves to the neutral axis of the article 10 being turned thereby contributes to the cold working of the metal of its surface. In such practice the tool 11 is preferably set straight in the tool post of the lathe, screw machine, or other turning machine-tool with its outer or tip end set such that the apex of its cutting edges 12, 12j, or 12, 12n, or 12, 12p is on a horizontal plane slightly below that in which lies the neutral axis of the article 10 being turned to dimension. The substantial increase of the cold working value of the top rake of either of the lateral cutting edges 12j, 12n, 12p is occasioned by the nick therein, as well as by said nick being slightly beveled with its high side progressing along its appropriate lateral cutting edge and highest at the cutting edge 12. Such nick, while cutting only surface 16b or 16c, increases the top rake of the lateral cutting edge of the cutter 11, while the bevel of said nick further increases the reluctance of the flow of the cut metal thereover by changing the direction of such flow to at less than a right angle due to its contact with metal cut from surface 16b or 16c, according to the bevel of said nick. When either of the pair of surfaces 16, 16b, or 16e, 16c are being simultaneously cut, the metal of article 10 in the region of the point of juncture of such pair of surfaces is cold worked to a greater extent due to the increased increased reluctance of the flow of cut metal over the tip or outer end of the tool 11 that is cut from such region.

The longitudinal as well as transverse arch of the side rake surface 18 of the tool 11 of Figs. 4, 5, 7 and 8 and the arched effect of the shaving 17, as yet unseparated from article 10 at its opposite sides, each substantially increase the reluctance of shaving 17 to passing over these arches of the side rake surface 18 in cutting as well as in turning and thereby further increase the cutting thrust of such tool 11 and the cold working effect upon the metal of the surface of article 10 being cut thereby.

Any number of the heretofore described means for increasing the cold working effect thereof upon the metal in the region of the line of its cleavage may be employed on a single cutter or turning tool 11 uniformly disposed throughout the extent of its cutting edge 12, or localized, accordingly as a uniform or a localized cold working may be desired, as well as to obtain the desired extent of such cold working.

In prior turning practice the cutting edge 12 of tool 11 is straight and lies in a horizontal plane passing within one thirty-second of an inch of the neutral axis of article 10, while in the present invention such edge meanders from a point much below such axis to and/or above such axis, which we have found increases the cold working effect of such cutting edge upon the metal of the surface of article 10 turned thereby.

All of the metal of the surfaces of article 10, being cold worked while being cut as heretofore described, is transformed by such cold working and cutting, which renders said metal tougher and more resistant to wear, corrosion, and other deterioration, as well as forms a surface of a finish and other characteristics which we have found more satisfactory in service than articles which have heretofore merely been normally cut or turned. While such metal does not possess all of the characteristics of case-hardened or heat treated metal, it is superior for many purposes, to and costs practically no more than, metal which has been merely normally cut or turned pursuant to prior practices.

It will be observed that by our invention, any article of a cold workable metal or alloy having a virgin cut or turned surface—that is, such surface as is cut or turned in accordance with our invention, without being otherwise treated or acted upon—is of metal of substantially different characteristics than the adjacent similar metal of the article; and that such transformation, of the characteristics of the metal of the surface or surfaces of any article formed by being cut or turned according to our invention, substantially increases the strength, toughness, wear and corrosion resistance of such metal, and otherwise renders it more advantageous for many kinds of service.

It may be understood from the foregoing, by those skilled in the art, that the before-described cold working of the cold workable metal, simultaneously with and by the manner of its cutting or turning, produces a transitory stress progressively along its surface being cut or turned and which stresses the metal in the region of such cutting or turning to a point beyond its elastic limit but not beyond its point of fracture. This cold working substantially increases the strength and toughness of the metal, its surface density and finish, as well as its resistance to corrosion and wear at and adjacent the line of cleavage effected in accordance with our invention.

Before our invention it was unknown that solely by cutting or turning a metal article, or a shaving therefrom, that such article or shaving may possess greater strength, toughness, surface density and finish, as well as resistance to corrosion and wear than was possessed by the parent metal before being so cut or turned.

We were first in the art to solve the heretofore long and vainly sought problem of inexpensively and expeditiously producing such changed advantageous characteristics by and simultaneously with the cutting or turning of any article of cold workable metal which normally did not possess such characteristics. In our solution of said problem we employ cold workable metal in the cheaper form of such metal which does not normally possess such characteristics. We abnormally cut or turn the metal article, or at least a portion of a surface thereof, and thereby transform the metal of and adjacent such cut or turned surface, or surfaces, to the before stated characteristics. Such transformation results from the abnormal cutting or turning in accordance with our invention, which stresses the metal adjacent its line of cleavage to an extent beyond its elastic limit and below its point of fracture. Under such stress a flowage of the metal occurs at and in the region of its line of cleavage, although the metal may be under atmospheric temperature except for such stress. Such flowage cold works metal of the article and transforms the same into characteristics which we have found very economical and advantageous.

We were first to cold work metal of an article by and simultaneously with the cutting or turning of the same, by our process and tool, from a larger piece of metal whose normal characteristics did not disclose, but which our said cold working by cutting or turning transforms into characteristics which we have found useful and advantageous for articles required in normal, as well as in severe, service conditions. Such transformation by cold working of metal occurs in the shaving or portion cut or turned by our process and tool from the parent metal, as well as in the metal of the surface of the parent article from which the shaving or portion was cut or turned.

We are aware of a prior practice, termed "Auto frettage", wherein high pressure liquid is directly applied within an ordnance bore to outwardly stress and stretch the metal of the wall of such bore beyond its elastic limit, but below its fracture point, to thereby transform the characteristics of such metal by imparting thereto increased strength and toughness. In such practice no cleavage of metal is involved, and every precaution is exercised to avoid any fracture or cleavage of metal therein, as the same destroys the utility of the manufactured bore which is subsequently subjected to such practice.

In our invention, cleavage controlled to a line conforming to a cut or turned surface of the required metal article is a very desirable part of our invention. Such cleavage is occasioned by stressing the metal along such line of cleavage at least to the shearing point, while at least the metal adjacent such line is subjected to compression stress beyond its elastic limit, but below its fracture point. We have found that such stressing may be associated with and occasioned by abnormal cleavage, and that the same beneficially transforms the characteristics of the metal of such stressed and cleaved article at least in the region of the line of cleavage. While the stressing of the metal involves the application of force in excess of that required for the normal cutting or turning of a given article, the magnitude of such stress is very materially reduced by the stressing being progressively and successively applied to different relatively small areas, preferably extending throughout the surface of the metal whose characteristics are to be transformed thereby. This also materially reduces the magnitude of the power required in the practice of our invention, as well as reduces the stress and wear upon the machine and the cutting or turning tools which may be required by such practice of simultaneously cutting or turning at least a surface of an article and cold working metal of such surface into stronger and tougher metal of increased density and resistance to wear and corrosion, with no more time and labor, and with but little more power, than is required for a like amount of cutting or turning in accordance with prior practice.

The invention described herein may be manufactured and used by or for the Government of the United States of America for governmental purposes without the payment of any royalties thereon or therefor.

Having now described our invention so fully that those skilled in this art may therefrom make and use the same, what we claim and desire to secure by Letters Patent is:

1. A tool for turning metal having an arched cutting edge and an arched side rake surface.

2. A tool for turning metal having an arched cutting edge extending longitudinally of the tool and an arched side rake surface.

3. A tool for turning metal having an arched cutting edge and a side rake surface arched in two directions.

4. A tool for turning metal having a cutting edge, a side rake surface, at least one nick in the cutting edge, and a groove extending from said nick at least partially across said side rake surface.

5. A tool for turning metal having a meandering cutting edge, an arched side rake surface, at least one nick in the cutting edge, and a groove extending from said nick at least partially across said side rake surface.

ALFRED J. BERG.
JOHN O. HUSE.